United States Patent [19]

Reil

[11] 3,927,297

[45] Dec. 16, 1975

[54] SEALING JAW

[75] Inventor: Wilhelm Reil, Bensheim-Auerbach, Germany

[73] Assignee: Altstädter Verpackungs-Vertriebs GmbH, Pfungstadt am Hintergraben, Germany

[22] Filed: July 29, 1974

[21] Appl. No.: 492,584

[30] Foreign Application Priority Data

Aug. 8, 1973 Germany............................ 2340078

[52] U.S. Cl............. 219/243; 93/DIG. 1; 100/93 P; 156/583; 338/311
[51] Int. Cl.²........................................... H05B 1/00
[58] Field of Search.................... 219/243; 156/515; 93/DIG. 1; 338/252, 311

[56] References Cited

UNITED STATES PATENTS

| | | | |
|---|---|---|---|
| 2,714,416 | 8/1955 | Fener............................... | 219/243 X |
| 3,047,991 | 8/1962 | Siegel et al. ..................... | 156/515 X |
| 3,271,560 | 9/1966 | Schott, Jr............................. | 219/243 |
| 3,283,126 | 11/1966 | Velvel............................... | 219/243 X |

Primary Examiner—C. L. Albritton

[57] ABSTRACT

A sealing jaw for sealing plastics material or plastics covered material includes a heating element of angular cross section with one limb received in a groove in a carrier to provide firm fixing. The carrier is of strip form and is clamped to a mounting of the jaw so as to be readily replaceable at low cost.

9 Claims, 7 Drawing Figures

Fig. 3
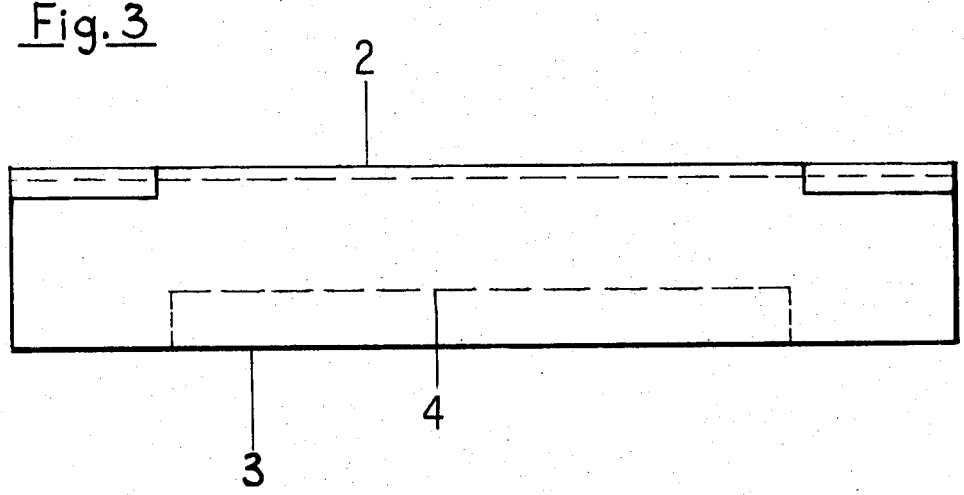
Fig. 4
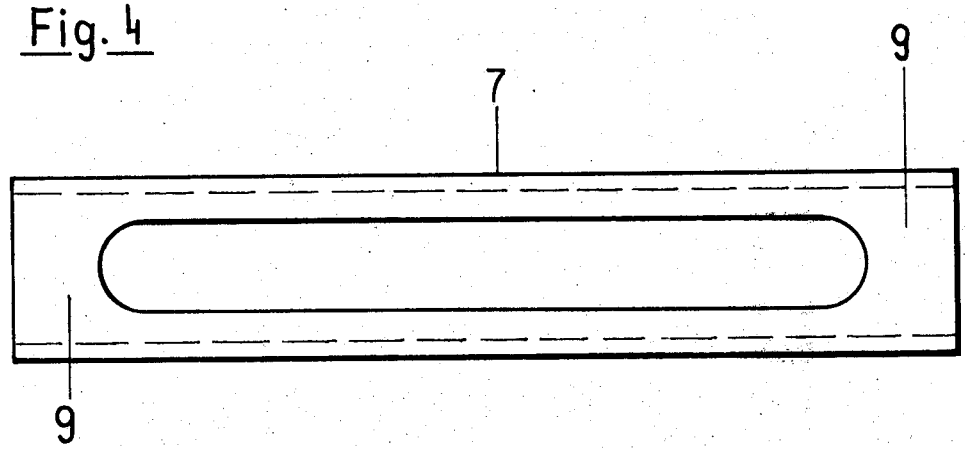
Fig. 5
Fig. 7
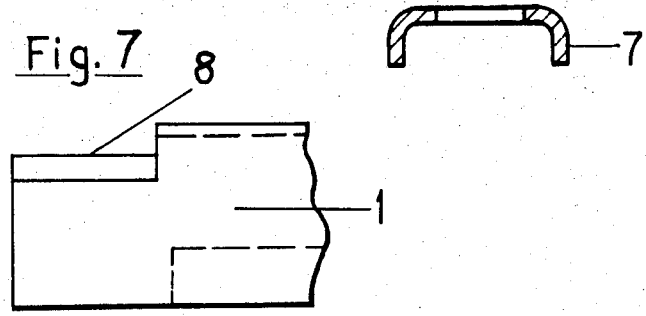

SEALING JAW

This invention relates to a sealing jaw for the sealing of synthetic plastics material or of paper, cardboard or the like, coated with synthetic plastics material.

In the production of packs of plastics material or of carrier material coated with plastics material such as polyethylene, it is usually necessary to connect two or more webs together by sealing, and this is effected by welding. Welding devices for this purpose are equipped with sealing jaws which are pressed either against a plunger or other fixed part or against corresponding opposed sealing jaws with material therebetween. In connection with the present invention the counter-presser element is of no interest, so that the description is directed solely to the sealing jaw. The sealing jaw must possess a certain strength, stability and pressure resistance, and be provided with cooling and heating means.

Known sealing jaws consist of a body having a bore for the throughflow of a cooling liquid, and, on one surface, an electrically heatably resistance wire or element. The body is often ceramic, to give good thermal conduction and allow cooling liquid flowing through the bore to be effective, and also to electrically insulate the resistance wire.

In mass production, sealing has to be effected at precisely predetermined positions, in a short time. The arrangement and securing of the resistance wire on the carrier body causes great difficulties in such circumstances. As a rule the welding is impulse welding, in which after the pressing together of the sealing jaws a brief heating impulse is applied to generate the welded seam, which is followed immediately by a cooling period wherein the welded seam sets. One disadvantage of this occurs on withdrawal or moving apart of the sealing jaws, because the synthetic plastics material is also partially welded with the working surface of the resistance wire, and on drawing apart of the sealing jaws the resistance wire pulls parts of the sealed webs irregularly apart. In order to avoid this, shortly before the moving apart of the sealing jaws a further, smaller heating pulse is passed through the resistance wire in order to melt the synthetic plastics material. Nonetheless it often occurs that due to this or other mechanical effects the resistance wire is torn out of its bed in the body and lies beside the groove, which makes the sealing jaw useless.

Attempts have been made to remedy this defect by welding the resistance wire on to a chromium oxide coating which is applied to the surface of the body. However the production and processing of chromium oxide are uneconomical, so that the results achieved remain unsatisfactory.

A further feature of sealing jaws is that the resistance wires burn through after a certain life, and the carrier body is destroyed at the burnt-through position. In known devices, when this occurs, the entire sealing jaw must be taken out and replaced by a new one, as re-use of used sealing jaws is usually impossible. This is expensive as the production of the known carrier bodies with the cooling bores and grooves or specially treated surfaces including chromium oxide and welded-on resistance wires is expensive.

According to the invention there is provided a sealing jaw including an electrically insulating, thermally conductive carrier of strip form, the carrier being detachably secured to a mounting of the jaw and having at least one groove, one limb of an electrical heating element of angular cross section being received in the groove, and the heating element extending above the surface of the carrier.

An exact maintenance of the dimension between the surface of the carrier and the resistance wire on the side facing the material to be sealed is desirable, and can be achieved with the jaw of the invention. However, the sealing jaw is easy and cheap to make, and the carrier, when worn out, can be easily replaced with a cheap, new carrier and element.

Production of the new sealing jaw is very economical, because the carrier body has the configuration of a strip on which a resistance wire is secured, possibly non-detachably. This saves material so that on burning through of the wire or other damage to the wire arrangement it is only necessary to replace the relatively cheap body.

A preferred feature of the invention is that the surface of the carrier body may have two parallel straight channels or grooves extending longitudinally on the outer edge. The depth of the grooves may be somewhat greater than the clear height of the corresponding limbs of the elements inserted. Due to the use of elements of angle-shaped cross-section, narrow grooves in the carrier body which provide an exact line for the elements are sufficient for exact retention. Due to the preferred feature that the depth is somewhat greater than the clear height of the element limb projecting into the carrier body, it is possible subsequently to effect material deformations of limited extent to make the element fast. Thus the above-mentioned difficulty that the wire may be pulled out of the carrier body on the moving apart of the sealing jaws is reduced.

In a further preferred feature, the underside of the carrier body has a longitudinal groove for the passage of a cooling medium. Thus, the bores provided in the known sealing jaws, which are expensive to make, are replaced in a simple manner by a longitudinal groove, which obviously can be provided more simply and more cheaply. By securing the carrier to the mounting in sealing manner, a flow passage is produced for the cooling liquid.

The retention and proper arrangement of the heating elements may be increased if two elements are connected to one another at their ends by contact pieces, and the carrier body is provided at its ends with depressions to receive the contact pieces. In sealing jaws the provision of a plane from which only the heating elements, and no other contact pieces or retaining parts protrude is important. The depressions in the carrier body, like the longitudinal groove for cooling, can be formed simply, and render possible the required accuracy of construction. The use of two resistance wires allows production of a doubled welded seam which then offers double security in the package. The connection of the two resistance wires at their ends can be provided either by a separate contact piece in each case, for example by a soldered-on metal plate or the like, or by making the elements by punching out of a sheet metal strip, in which case the wires and the contact pieces are integral.

In one embodiment of the invention the carrier body is of surface-anodised aluminium. Aluminium oxide and nickel oxide are other examples of materials for the carrier. In contrast with powder-pressed ceramic material of known sealing jaws, these materials readily permit the production and maintenance of precise dimension on the sealing jaw. According to the thickness of the material to be welded, differently dimensioned sealing jaws must be used. In this respect the invention has the advantage that the user in each case can keep a larger number of sealing jaws of different kinds in stock without extensive cost, or can keep a selection of carriers.

It is possible to provide centering openings in the carrier. The replacement of the sealing jaws is thereby substantially simplified.

It is advantageous to provide a gasket between the carrier and the mounting, with clamping rails for securing the bodies to one another, which rails can be urged towards one another by screws or the like. This manner of fitting the carrier on the mounting body of the welding machine is surprisingly simple and, as practical experience has shown, operationally reliable. This design also offers the advantage of the possibility of replacing of the sealing jaw in simple and time-saving manner. The use of a gasket, for example O-ring, likewise causes no difficulties because in the case of damage it is only necessary for the gasket to be taken out and replaced by a new one, which merely needs to be inserted in the groove provided in the mounting body. The clamping action of the clamping rails is adequate, because in operation the working force acts to move the gasket towards a sealing position. The clamping rails have the further advantageous effect that on clamping an element which may be applied loosely in the groove of the carrier, is clamped more firmly.

Preferably, one arm of the element is inserted into the groove and clamped fast by pressing once. A slight material deformation is possible which is permitted by the feature already mentioned above, namely that the depth of the channel is somewhat greater than the overall height of the limb inserted. Resistance elements formed in this way are readily obtainable. According to the length of the arms which protrude into the channels in the carrier body, a more or less strong fixture of the resistance wire in the carrier can be achieved, without the need for welding or other measures.

The following description of one embodiment is given by way of example with reference to the accompanying drawings in which:

FIG. 3 shows a side elevation of the carrier body;

FIG. 4 shows a plan view of the resistance element;

FIG. 5 shows a cross-sectional view of the element;

FIG. 7 shows an individual view of the carrier body.

Figure 1:
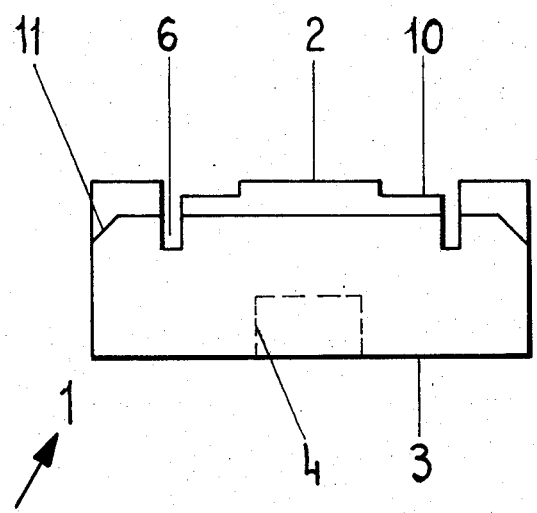
FIG. 1 shows a cross-sectional view through the carrier body.
Figure 2:
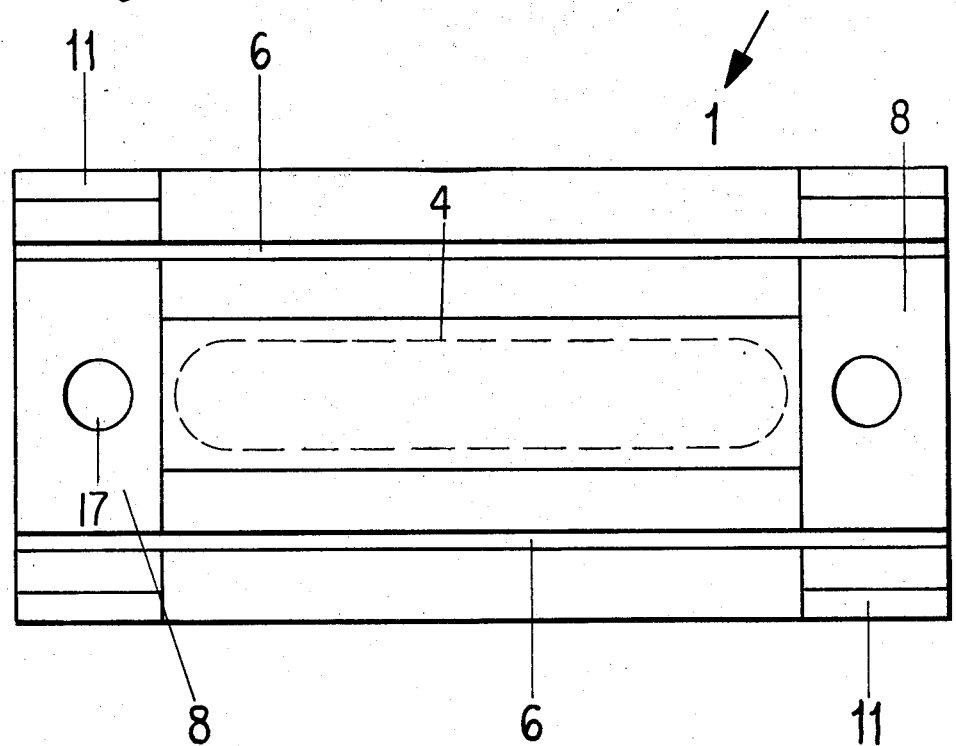
FIG. 2 shows a plan view of the carrier body.

The sealing jaw consists of a carrier body in the form of a strip 1, the upper surface 2 of which is the working face adjacent to the material to be sealed. The lower surface 3 of the carrier body 1 is provided with a longitudinal groove 4 for the throughflow of the cooling liquid 5. The carrier body has two grooves or channels 6 on its upper surface 2 in which extend the resistance element 7. The channels 6 extend longitudinally of the strip in the vicinity of the outer edges.

One particular form of the resistance wire is illustrated in FIGS. 4 and 5. Here it is an integral part which is produced from a strip by punching out and bending over at the edges. Between the terminal contact pieces extend resistance elements 7 arranged parallel with one another and having limbs to be inserted downwards into the channels 6 in the carrier body 1 and horizontal limbs which lie in the recess 10 indicated in FIG. 1. In the particular form illustrated the carrier body 1 also has chamfers 11 on its edge at its outer ends, but these are not essential.

Figure 6:
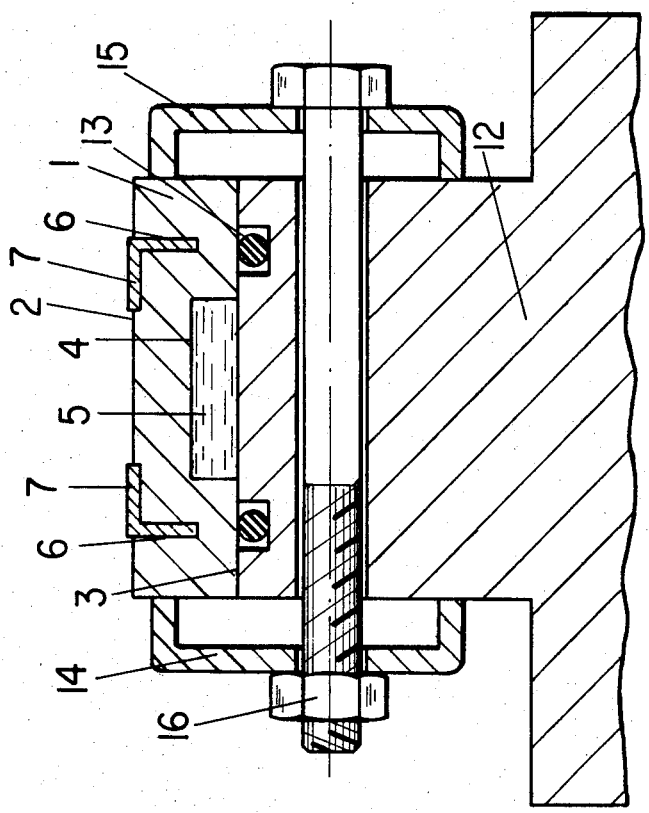
FIG. 6 shows the overall assembly of sealing jaw and mounting body, completed by the resistance element.

In FIG. 6 the device is shown in assembled form. The resistance element 7 in the form of the two parallel angular wires 7 is inserted and clamped fast in the channels 6 of the carrier body 1. The carrier body in turn rests against a mounting body 12 of the jaw. A seal between the bodies is provided by an O-ring 13. If this should be damaged, it can easily be replaced, with the carrier body 1 removed, by inserting a new ring. A cooling liquid 5 flows in the longitudinal groove 4. The carrier body 1 is firmly fitted on the mounting body 12 by means of clamping rails 14 and 15 which are urged towards one another by a screw connection 16 and each engage both bodies. This pressing action of the rails also presses the outer sides of the carrier body 1 inwards, so that the arms of the resistance element 7 inserted into the channels 6 are additionally clamped. As shown in FIG. 3 the resistance elements are stamped-out of sheet metal strips, with the contact pieces 9 integral with the elements 7. When there is a soldered-on metal plate for the contact piece as in FIG. 7, the carrier body 1 is provided with a depression 8 which serves to receive the metal plate.

The carrier has centering openings 17 to co-operate, for instance with projections on the mounting.

I claim:

1. A sealing jaw comprising a mounting, an electrically insulating, thermally conductive carrier of strip form, the carrier being detachably secured to the mounting, at least one groove in a surface of the carrier, an electrical heating element of angular cross section, a limb of said element being received in the groove, and the element extending above said surface of the carrier, wherein said one limb of the element is inserted into the groove and clamped fast and substantially immovable therein by a single pressing.

2. A sealing jaw as claimed in claim 1 including two grooves in said surface and two heating elements of angular cross section of about 90°, one said element being received in each groove.

3. A sealing jaw as claimed in claim 2 wherein the heating elements are integral with the contact pieces.

4. A sealing jaw comprising a mounting, an electrically insulating, thermally conductive carrier of strip form, the carrier being detachably secured to the mounting, at least two grooves in a surface of the carrier, at least two electrical heating elements of angular cross section, a limb of each said element being received in the corresponding groove, and each element extending above said surface of the carrier, wherein said one limb of each said element is inserted into the groove and clamped fast and substantially immovable therein by a single pressing, including the fact that two grooves are provided in said surface and two heating elements are provided of angular cross section of about 90 degrees, one said element being received in each groove.

5. A sealing jaw comprising a mounting, an electrically insulating, thermally conductive carrier of strip form, the carrier being detachably secured to the mounting, at least two grooves in a surface of the carrier, at least two electrical heating elements of angular cross section, a limb of each said element being received in the corresponding groove, and each element extending above said surface of the carrier, wherein said one limb of each said element is inserted into the groove and clamped fast and substantially immovable therein by a single pressing, including the fact that two grooves are provided in said surface and two heating elements are provided of angular cross section, one said element being received in each groove, including contact pieces connecting said two heating elements to one another at their ends, and depressions in the carrier in which the contact pieces are located.

6. A sealing jaw comprising a mounting, an electrically insulating, thermally conductive carrier of strip form, the carrier being detachably secured to the mounting, at least one groove in a surface of the carrier, an electrical heating element of angular cross section, a limb of said element being received in the groove, and the element extending above said surface of the carrier, wherein a surface of the carrier remote from said surface has a longitudinal groove defining, with the mounting, a passage for a cooling medium.

7. A sealing jaw comprising a mounting, an electrically insulating, thermally conductive carrier of strip form, the carrier being detachably secured to the mounting, at least one groove in a surface of the carrier, an electrical heating element of angular cross section, a limb of said element being received in the groove, and the element extending above said surface of the carrier, wherein the carrier is of surface-anodised aluminum.

8. A sealing jaw comprising a mounting, an electrically insulating, thermally conductive carrier of strip form, the carrier being detachably secured to the mounting, at least one groove in a surface of the carrier, an electrical heating element of angular cross section, a limb of said element being received in the groove, and the element extending above said surface of the carrier, including a gasket located between the carrier and the mounting and clamping rails securing said carrier and mounting to one another, said rails being urgable toward one another to engage the carrier and mounting.

9. The sealing jaw defined in claim 1, wherein said heating element extends above said surface of the carrier.

* * * * *